2,823,204

ALKALOIDS OF VOACANGA

Maurice-Marie Janot and Robert Goutarel, Paris, France, assignors to Les Laboratoires Gobey, Paris, France, a corporation of France No Drawing. Application March 30, 1956
Serial No. 574,977

8 Claims. (Cl. 260—236)

The present invention relates to new alkaloids and more particularly to new alkaloids of plants of the genus Voacanga, and to a process of making same.

Plants of the genus Voacanga are common to East Africa and Madagascar. Heretofore, they have only been of interest to botanists and did not find any appreciable use in industry or the medical art.

It is one object of the present invention to provide new and highly effective extracts from plants of the genus Voacanga which extracts are useful in therapy.

Another object of the present invention is to provide the new alkaloid voacangine which can be prepared from such plants of the genus Voacanga.

Still another object of the present invention is to provide the new alkaloid voacamine from such plants of the genus Voacanga.

A further object of the present invention is to provide the new alkaloid voacaminine from plants of the genus Voacanga.

A further object of the present invention is to provide the new alkaloid vobtusine from such plants of the genus Voacanga.

Another object of the present invention is to provide a process of producing such new alkaloids from plants of the genus Voacanga.

The four names aforementioned have been designated by us as the generic names of said respective compounds.

Other objects of the present invention and advantageous features thereof will become apparent as the description proceeds.

Plants of the genus Voacanga belong to the family Apocynaceae. Such genus comprises, for instance, the following two species: *Voacanga africana* Stapf and *Voacanga thuarsii* Roem. and Schultes var. *obtusa* (K. Sch.) Pichon as they are described, for instance, in "Bull. Mus. Hist. Nat." (2), vol. 19, page 409 (1947).

These two species of said genus Voacanga have proved to be especially suitable as starting material in the process according to the present invention although other species may, of course, also be used.

In principle, the present invention comprises the preparation of the above mentioned four alkaloids voacangine, voacamine, voacaminine, and vobtusine from such plants of the genus Voacanga. These alkaloids possess very interesting therapeutic properties which permit their utilization in the treatment of cardio-vascular disturbances.

During the last years an increase in circulatory disorders and disturbances due either to chronic cardiac insufficiencies or to vascular deficiencies caused by pathologic changes in the lipo-protein equilibrium of the body fluids has been witnessed. Rheumatic, atherosclerotic, and hypertensive cardiopathies are diseases which cause most of the deaths of our times. It is, therefore, very meritorious to provide a new and effective cardiotonic agent which not only acts quite rapidly but which is also of low toxicity in therapeutical doses. Treatment of cardiovascular disturbances by means of Voacanga alkaloids yields spectacular results due to their specific inotropic activity which, in some cases, is accompanied by a pronounced cornary vasodilatation and a remarkable increase in diuresis. The new alkaloids, therefore, represent very valuable therapeutic agents.

The process of producing said alkaloids consists in first preparing specific extracts of the comminuted plant material and especially of the roots and the bark of said plants. By such an extraction process, all the active principles of the Voacanga starting material are transferred to the extracts. By subsequent chromatographic treatment over aluminum oxide it is possible to separate the cardiotonic alkaloids obtained thereby.

In this manner there are produced the following alkaloids:

(1) Voacamine, a colorless microcrystalline compound which melts at 222–223° C. and has a rotatory power $[\alpha]_D^{20} = 52° \pm 2°$ (chloroform) and the probable formula $C_{45}H_{56}O_6N_4$.

(2) Vobtusine, colorless prisms which melt at 299° C., of the rotatory power $[\alpha]_D^{20} = -321° \pm 5°$ (chloroform) and the probable formula $C_{45}H_{54}O_8N_4$.

(3) Voacangine, colorless prisms which melt at 137–138° C., of the rotatory power $[\alpha]_D^{20} = 42° \pm 2°$ (chloroform) and the probable formula $C_{22}H_{28}O_3N_2$.

(4) Voacaminine, needles or prisms which melt at 242° C., of the rotatory power $[\alpha]_D^{20} = -48° \pm 4°$ (chloroform) and the probable formula $C_{22}H_{26}O_3N_2$.

Said alkaloids are advantageously administered by oral or rectal application. They can also be administered by intravenous, intraperitoneal or intramuscular injection.

Preparations useful for administration are tablets, dragees, and other solid compressed preparations, powders, suppositories, aqueous solutions, or suspensions either of the alkaloids themselves or of their addition salts with suitable mineral or organic acids.

The following examples serve to illustrate the present invention without, however, limiting the same thereto.

Example 1

1000 g. of the pulverized bark of *Voacanga africana* is extracted by means of 10 liters of a 2% acetic acid solution in alcohol, i. e., 9.8 liters of 95% ethanol and 0.2 liter of acetic acid. The resulting percolate is concentrated by distillation in a vacuum at a temperature not exceeding 40° C. At the end of said concentration, the ethanol is replaced by 2 liters of water.

The aqueous solution is freed of fatty material by stirring twice with petroleum ether, each time with 250 cc. of petroleum ether (boiling point: between 50° C. and 70° C.). The fat-free aqueous solution is purified by filtration through kieselguhr whereby a clear yellowish brown solution is obtained. Ammonia is added to said solution in an amount sufficient to adjust the pH to 9.0. The alkaline solution is four times extracted with ether, twice with 500 cc. each time and twice with 250 cc. each time. The ethereal extract is washed with water and is evaporated to dryness, finally in a vacuum. 35 g. of evaporation residue representing the crude alkaloid bases are obtained. Said crude product is dissolved in methanol. Concentrated hydrochloric acid is added to the solution in an amount sufficient to adjust the pH to 2.0. The resulting solution is evaporated to dryness in a vacuum and yields 40 g. of a residue representing the hydrochlorides of said four alkaloids.

The hydrochlorides are dissolved in 500 cc. of water. The solution is filtered and rendered alkaline by the addition of ammonia. The alkaline solution is again extracted four times with ether (two times with 500 cc. each time and two times with 250 cc. each time). The ethereal solution is washed with water and evaporated to dryness, finally in a vacuum. The evaporation residue consisting of the purified alkaloid bases weighs 34 g.

In place of ethyl ether there can be employed isopropyl ether, or acetic acid ethyl ester for extracting the crude mixture of the new alkaloid bases from their ammonical solution.

The yield of the mixtures of crude alkaloid bases obtained in the above described manner is about as follows:

1.46% from the roots of *Voacanga africana*,
3.5% from the bark of *Voacanga africana*,
1.20% from the roots of *Voacanga obtusa*, and
2.71% from the bark of *Voacanga obtusa*.

Plants of the genus Voacanga, therefore, represent a very rich source of such cardiotonic and hypotensive alkaloids.

The alkaloids are not present as such in the plant material but in the form of complex substances in which said alkaloids are combined with organic acids related for example to tannoids. They are set free therefrom in the course of the extraction process.

The acid addition salts with other acids than with hydrochloric acid are formed in an analogous manner as described hereinabove for said hydrochloride by using, in place of hydrochloric acid, other acids such as mineral acids, for instance, hydrobromic acid, sulfuric acid, phosphoric acid, nitric acid, and the like, or organic acids, such as acetic acid, propionic acid, malonic acid, succinic acid, maleic acid, lactic acid, citric acid, tartaric acid, benzoic acid, salicylic aid, nicotinic acid, isonicotinic acid, and others.

*Example 2*

34 g. of the purified alkaloid bases obtained according to Example 1 are dissolved in 1,000 cc. of benzene and are subjected to a chromatographic treatment over 1,000 g. of aluminium oxide (Merck Standard). The aluminium oxide column is then fractionally eluted with 1 liter of solvent each time. First the aluminium oxide column is eluted twice with benzene. The resulting two liters of benzene eluate are evaporated to dryness and yield 7.5 g. of a residue which is dissolved in methanol and allowed to stand in a refrigerator. Thereby, 6.5 g. of voacangine are obtained. This alkaloid is purified by recrystallization from methanol.

The pure compound is obtained in the form of white prisms of the melting point 137–138° C. and the rotatory power $[\alpha]_D^{20}=-42°\pm2°$ (concentration: 1.26% in chloroform). Voacangine is very soluble in acetone and chloroform and only slightly soluble in methanol and ethanol. It sublimates at 135° C. in a vacuum of 0.01 mm. Its ultraviolet spectrum exhibits the following characteristic maxima:

max λ 225 mμ (log ε=4.43)
max λ 287 mμ (log ε=3.97)

Such an ultraviolet spectrum indicates the structure of a derivative of 5-methoxy indole. The spectrum is very similar to that of voacamine.

The infrared spectrum shows a band, indicating an NH-group, at 2.87 μ, another band, indicating a COOR-group, at 5.87 μ, and further bands, indicating an 1,2,4-tri-substituted benzene ring, in the region between 12.0 μ and 12.4 μ. The infrared spectrum, therefore, confirms the assumption that the methoxy group is present in 5-position of an indole ring and, since two methoxy groups were found on analysis, that voacangine has a methyl ester group in addition to the methoxy group.

Analysis. — $C_{22}H_{28}O_3N_2$: Calculated. — 71.71% C; 7.66% H; 7.60% N; 16.84% $OCH_3$. Found.—71.79% C; 7.67% H; 7.63% N; 16.42% $OCH_3$.

*Example 3*

Elution of the chromatographic column resulting after separation of voacangine according to Example 2 is continued and the eluate obtained on passing 12 liters of benzene through the aluminum oxide is evaporated to dryness. 14 g. of evaporation residue are obtained which are dissolved in methanol. The solution yields on gentle heating, rapidly, a crystalline precipitate of voacamine.

Said crude voacamine is purified by dissolving it in ether, adding methanol to the ether solution, and concentrating by evaporation the mixture until crystallization sets in. The yield of pure voacamine amounts to 4.75 g. Voacamine can also be recrystallized from a mixture of acetone and methanol.

Said compound is obtained in the form of white microcrystalline needles or prisms which are soluble in acetone, chloroform, and benzene and are slightly soluble in methanol and ethanol. The melting point of voacamine is 222–223° C. Its rotatory power $[\alpha]_D^{20}=-52°\pm2°$ (concentration: 1% in chloroform). The compound exhibits in the ultraviolet spectrum the following characteristic absorption maxima:

max λ 230 mμ (log ε=4.59)
max λ 295 mμ (log ε=4.16)

The ultraviolet spectrum is very similar to that of a 5-methoxy indole derivative.

The infrared spectrum shows in the region of vibration C=O two strong bands at 5.8 μ and at 5.87 μ which bands apparently indicate the presence of two ester groups.

Analysis. — $C_{45}H_{56}O_6N_4$: Calculated. — 72.16% C; 7.53% H; 7.48% N; 12.42% $OCH_3$. Found.—72.30% C; 7.60% H; 7.83% N; 12.87% $OCH_3$.

Voacamine apparently contains a methylamino group since it decomposes, when molten in a vacuum, with the generation of basic vapors smelling of methylamine. It is possible that voacamine possesses a betaine group.

Analytical determination of methoxy groups indicates that three methoxy groups are present in this molecule.

In view of the presence of 4 nitrogen atoms in the molecule, it can be assumed that this compound is a double molecule.

*Example 4*

The chromatographic aluminum oxide column, after elution with benzene according to Example 3 is eluted with ether in amounts of 1000 cc. for each elution. The first two eluates are combined and are evaporated to dryness. 1 g. of a residue is obtained which yields, on dissolving in methanol, 900 mg. of voacaminine.

Voacaminine can also be eluted from the chromatographic aluminum oxide column by means of a mixture of benzene and acetone containing 10% of acetone.

Said compound is obtained in the form of colorless prismatic needles which are soluble in acetone, chloroform, and benzene and only slightly soluble in methanol and ethanol. Its melting point is 242° C. Its rotatory power $[\alpha]_D^{20}=-45°\pm2°$ (concentration: 0.44% in chloroform). Its ultraviolet spectrum and also its infrared spectrum are identical with those of voacamine.

Ultraviolet spectrum:

max λ 225 mμ (log ε=4.48)
max λ 295 mμ (log ε=4.03)

Infrared spectrum: Absorption bands at 5.8 μ and 5.87 μ. With the exception of the higher melting point, all the other physical characteristics of voacaminine, such as rotatory power, ultraviolet spectrum, infrared spectrum are identical with those of voacamine.

Analysis. — $C_{45}H_{56}O_6N_4$: Calculated. — 72.16% C; 7.53% H; 7.48% N; 12.42% $OCH_3$. Found: 72.20% C; 7.30% H; 7.80% N; 12.60% $OCH_3$.

*Example 5*

The chromatographic aluminum oxide column, after elution with two liters of ether, as described in Example 4, is subsequently eluted with 6 liters of ether. On evaporation to dryness of the eluate, 5 g. of a residue are obtained which crystallizes slowly from methanol and yields 600 mg. of vobtusine.

This compound is obtained in the form of white prisms which are soluble in chloroform and only slightly soluble in acetone, methanol, and ethanol. Its melting point is 299° C., its rotatory power $[\alpha]_D^{20} = -321° \pm 5°$ (concentration: 1% in chloroform).

Vobtusine has a characteristic ultraviolet spectrum with the following maxima:

max $\lambda$ 220 m$\mu$ (log $\epsilon$=4.66)
max $\lambda$ 267 m$\mu$ (log $\epsilon$=4.01)
max $\lambda$ 325 m$\mu$ (log $\epsilon$=4.25)

Such an ultraviolet spectrum indicates that the compound is of distinctly aromatic character.

The infrared spectrum shows vibration C=O at 5.95 $\mu$ which linkage might correspond to a CO—NH grouping or to an ester grouping conjugated to a double bond or to a lactone grouping of the coumarine type. A very strong band at 6.22 $\mu$ unquestionably indicates benzene character, and the strong benzene bands in the region between 13 $\mu$ and 14 $\mu$ confirm the aromatic character of the molecule.

*Analysis.*—Calculated: 69.38% C. 6.98% H. 7.19% N. 7.96% OCH$_3$. Found: 69.71% C. 7.03% H. 7.68% N. 7.68% OCH$_3$.

Pharmacological tests with these new alkaloids show that they have a surprisingly valuable effect on the treatment of cardiovascular diseases.

The new alkaloids or their acid addition salts are used in therapy, preferably in dilute form, thus, allowing better and more economical use to be made thereof.

In the administration of such compounds in capsules, as powder, a fine uniform dispersion of the active product throughout said powder is desirable. Such a fine dispersion can be achieved, for instance, by intimately mixing and milling the compound in a ball mill with a solid, pulverulent extending agent to the desired degree of fineness, or by impregnating the already milled, finely powdered, solid carrier with a mixture of the active compound in water or other suitable solvents, and then removing the water or solvent. When preparing tablets, pills, dragees, and the like shaped solid preparations for oral administration, the commonly used diluting agents, binders, lubricants, and the like, are employed, such as sugar, lactose, talcum, starch, bolus alba, as binders, pectin, gelatin, gum arabic, methyl cellulose, yeast extract, agar, tragacanth, and as lubricants, stearic acids, magnesium stearate, and others.

The content of active compounds in such preparation may vary. The preparation may consist of the one or the other of said alkaloids or of mixtures thereof or of their addition salts with compatible acids in the employed doses, to the human body and a small amount of binding and/or lubricating agent.

The preparation may also contain a predominant amount of diluting agent, binder, lubricant and other tableting adjuvants. It is, of course, of advantage that the active compounds in said preparations is present in such an amount that a suitable dosage will be ensured.

Of course, many changes and variations in the extracting and eluting agents used, in the methods of working up the extracts, of separating and purifying the alkaloids, and the like may be made by those skilled in the art in accordance with the principles set forth herein and in the claims annexed hereto.

We claim:

1. The alkaloid voacamine, forming colorless microcrystals having a melting point of about 222–223° C. and the rotatory power $[\alpha]_D^{20} = -52° \pm 2°$ (concentration: 1% in chloroform), obtained by extracting parts of plants of the genus Voacanga with ethanol containing acetic acid, removing the ethanol, treating the residue with benzene, passing the benzene solution through a chromatographic adsorbing agent, and fractionally eluting said alkaloid from said adsorbing agent.

2. The alkaloid vobtusine, forming colorless prisms having a melting point of about 299° and the rotatory power $[\alpha]_D^{20} = -321° \pm 5°$ (concentration: 1% in chloroform), obtained by extracting parts of plants of the genus Voacanga with ethanol containing acetic acid, removing the ethanol, treating the residue with benzene, passing the benzene solution through a chromatographic adsorbing agent, and fractionally eluting said alkaloid from said adsorbing agent.

3. The alkaloid voacangine, forming colorless prisms having a melting point of about 137–138° C. and a rotatory power $[\alpha]_D^{20} = -42° \pm 2°$ (concentration: 1.26% in chloroform), obtained by extracting parts of plants of the genus Voacanga with ethanol containing acetic acid, removing the ethanol, treating the residue with benzene, passing the benzene solution through a chromatographic adsorbing agent, and fractionally eluting said alkaloid from said adsorbing agent.

4. The alkaloid voacaminine, forming needles and prisms of the melting point 242° C. and the rotatory power $[\alpha]_D^{20} = -48° \pm 4°$ (concentration: 0.44% in chloroform), obtained by extracting parts of plants of the genus Voacanga with ethanol containing acetic acid, removing the ethanol, treating the residue with benzene, passing the benzene solution through a chromatographic adsorbing agent, and fractionally eluting said alkaloid from said adsorbing agent.

5. The alkaloids selected from the group consisting of voacangine, voacamine, voacaminine, vobtusine, and their acid addition salts, obtained by extracting parts of plants of the genus Voacanga with ethanol containing acetic acid, removing the ethanol, treating the residue with benzene, passing the benzene solution through a chromatographic adsorbing agent, and fractionally eluting said alkaloid from said adsorbing agent.

6. In the process of producing Voacanga alkaloids, the steps comprising mixing pulverized parts of plants of the genus Voacanga with a 2% solution of acetic acid in ethanol until substantially all the alkaloids present in said plant parts are dissolved by said alcoholic solution, removing the resulting alcoholic extract from the extracted plant parts, evaporating the alcohol in a vacuum at the temperature not exceeding about 40° C., adding water to the residue, removing fatty matter present in the resulting aqueous solution by extracting with a fat solvent, adding ammonia to the fat-free aqueous solution in an amount sufficient to adjust the pH-value of the solution to a pH of about 9.0, stirring the ammoniacal solution with a water-insoluble solvent, separating the solvent phase from the aqueous phase, repeating said stirring with a water-insoluble solvent and separation of the solvent phase from the aqueous phase until substantially all the alkaloids are transferred into the solvent phase, and evaporating the solvent phase to dryness in a vacuum.

7. In the process of producing Voacanga alkaloids, the steps comprising lixiviating parts of plants of the genus Voacanga by means of ethanol containing acetic acid, distilling off the alcohol from the resulting alcohol extract, dissolving the distillation residue in water, rendering alkaline the aqueous solution, and extracting the alkaline solution by means of water immiscible solvents for said alkaloids.

8. In the process of separating Voacanga alkaloids from each other, the steps comprising dissolving the mixture of Voacanga alkaloids in benzene, passing the benzene solution through chromatographic aluminum oxide, fractionally eluting the adsorbed alkaloid from said chromatographic aluminum oxide by means of benzene thereby first producing a benzene eluate fraction containing voacangine and then producing a benzene eluate fraction containing voacamine, and thereafter fractionally eluting the chromatographic aluminum oxide by means of ether, thereby first producing an ether eluate fraction containing voacaminine and subsequently an ether eluate fraction containing vobtusine.

References Cited in the file of this patent

Janot et al.: Compte Rend., vol. 240, pp. 1719–20 and 1800–1801 (1955).